United States Patent
Shi et al.

(10) Patent No.: US 11,445,413 B2
(45) Date of Patent: Sep. 13, 2022

(54) METHOD AND NETWORK NODES TO MANAGE QOE MEASUREMENT COLLECTION DURING RELOCATION OR HANDOVER

(71) Applicant: Telefonaktiebolaget LM Ericsson (publ), Stockholm (SE)

(72) Inventors: Nianshan Shi, Järfälla (SE); Cecilia Eklöf, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/485,582

(22) PCT Filed: Dec. 28, 2017

(86) PCT No.: PCT/IB2017/058474
§ 371 (c)(1),
(2) Date: Aug. 13, 2019

(87) PCT Pub. No.: WO2018/150249
PCT Pub. Date: Aug. 23, 2018

(65) Prior Publication Data
US 2020/0022034 A1 Jan. 16, 2020

Related U.S. Application Data (60) Provisional application No. 62/458,943, filed on Feb. 14, 2017.

(51) Int. Cl.
*H04W 4/00* (2018.01)
*H04W 36/00* (2009.01)
*H04W 36/14* (2009.01)

(52) U.S. Cl.
CPC ............ *H04W 36/0058* (2018.08); *H04W 36/0044* (2013.01); *H04W 36/0066* (2013.01); *H04W 36/14* (2013.01)

(58) Field of Classification Search
CPC ......... H04W 36/0058; H04W 36/0044; H04W 36/0066; H04W 36/14; H04W 76/27;
(Continued)

(56) References Cited

U.S. PATENT DOCUMENTS 8,971,290 B2 * 3/2015 Liang ............... H04W 76/34
370/331
9,930,675 B2 * 3/2018 Wei ................... H04W 72/0493
(Continued)

FOREIGN PATENT DOCUMENTS

CN 101594610 A 12/2009
CN 101783754 A 7/2010
(Continued)

OTHER PUBLICATIONS

3rd Generation Partnership Project, "3rd Generation Partnership Project; Technical Specification Group Radio Access Network; UTRAN Iu interface Radio Access Network Application Part (RANAP) signalling (Release 14)", Technical Specification, TS 25.413 V14.1.0, Jun. 1, 2017, pp. 1-456, 3GPP, France.
(Continued)

*Primary Examiner* — Stephen M D Agosta
(74) *Attorney, Agent, or Firm* — Coats & Bennett, PLLC (57) ABSTRACT

Quality of Experience (QoE) Measurement collection is continued from a source network node (200) providing service to a terminal (210) to a target network node (200) following a SRNS relocation or inter-RAT handover of the terminal (210). When the source network node (200) is preparing for the transfer of a terminal (210) for which a QoE Measurement is configured, QoE Measurement parameters, which have been received by the source network node (200) from a first Measurement Initiating node (200), are sent from the source network node (200) to the target network node (200). The target network node (200) provides
(Continued)

information about the handling of the ongoing QoE measurement to the source network node (200), e.g., whether the QoE measurement is to be continued or terminated. The source network node (200) updates to the first Measurement Initiating node (200) whether the target network node (200) will continue the QoE Measurement. If the target network node (200) has a QoE Measurement configured by a second, different Measurement Initiating node (200), it may continue the QoE Measurement under that configuration, and send to the source network node (200) some or all related QoE Measurement parameters.

18 Claims, 5 Drawing Sheets

(58) Field of Classification Search
CPC ............. H04W 80/10; H04W 28/0268; H04W 76/12; H04W 76/11; H04L 12/4633; H04L 43/0852; H04L 63/20; H04L 67/10; H04L 43/08; H04L 12/14; H04M 15/00; H04M 15/51; H04M 15/66; H04M 15/8016; H04M 15/8228; H04M 15/8038; G06F 9/45558; G06F 2009/45595; G06F 11/1076; G06F 2009/4557; G06F 11/1068; G06F 11/108; G06F 11/1092; G06F 11/3006; H04B 17/309; H04B 17/382; H04B 7/02; H04B 7/0617; H04B 7/0695
See application file for complete search history.

(56) References Cited

U.S. PATENT DOCUMENTS

| | | | |
|---|---|---|---|
| 10,368,284 B2* | 7/2019 | Lau | H04W 36/0083 |
| 2005/0075099 A1* | 4/2005 | Guyot | H04W 36/125 455/414.1 |
| 2005/0159186 A1* | 7/2005 | Cho | H04W 72/08 455/560 |
| 2006/0035645 A1* | 2/2006 | Kim | H04W 36/0007 455/452.1 |
| 2007/0099576 A1* | 5/2007 | Vukovic | H04W 36/02 455/67.13 |
| 2007/0165600 A1* | 7/2007 | Fauconnier | H04W 88/06 370/352 |
| 2008/0153495 A1* | 6/2008 | Ogami | H04W 36/30 455/436 |
| 2009/0122730 A1* | 5/2009 | Yang | H04W 36/30 370/280 |
| 2009/0270104 A1* | 10/2009 | Du | H04W 48/02 455/436 |
| 2010/0027507 A1* | 2/2010 | Li | H04W 36/0058 370/331 |
| 2010/0081428 A1* | 4/2010 | Maejima | H04W 36/0055 455/426.1 |
| 2010/0135171 A1 | 6/2010 | Jung et al. | |
| 2010/0182912 A1* | 7/2010 | Hongisto | H04L 47/803 370/242 |
| 2011/0274038 A1* | 11/2011 | Zhu | H04W 36/0022 370/328 |
| 2011/0319115 A1 | 12/2011 | Racz | |
| 2012/0003976 A1* | 1/2012 | Bhat | H04W 48/18 455/436 |
| 2012/0039181 A1* | 2/2012 | Aziz | H04W 36/245 370/241 |
| 2012/0142357 A1* | 6/2012 | Aminaka | H04W 36/0058 455/437 |
| 2012/0230264 A1* | 9/2012 | Zhang | H04W 72/04 370/329 |
| 2013/0078956 A1* | 3/2013 | Feng | H04W 12/041 455/411 |
| 2013/0237157 A1 | 9/2013 | Phan et al. | |
| 2013/0268577 A1 | 10/2013 | Oyman | |
| 2014/0003322 A1* | 1/2014 | Grinshpun | H04W 36/0007 370/312 |
| 2014/0066107 A1 | 3/2014 | Schmidt et al. | |
| 2014/0080506 A1 | 3/2014 | Siomina | |
| 2014/0106757 A1* | 4/2014 | Hakola | H04W 76/23 455/440 |
| 2014/0146691 A1* | 5/2014 | Soliman | H04W 24/10 370/252 |
| 2014/0160941 A1 | 6/2014 | Hui et al. | |
| 2014/0169334 A1* | 6/2014 | Karlsson | H04W 36/0058 370/331 |
| 2014/0233384 A1* | 8/2014 | Howard | H04L 67/2842 370/235 |
| 2014/0321432 A1* | 10/2014 | Li | H04W 36/24 370/331 |
| 2015/0017985 A1* | 1/2015 | Safavi | H04W 36/0085 455/436 |
| 2015/0208288 A1* | 7/2015 | Fu | H04W 36/00835 370/331 |
| 2015/0271250 A1* | 9/2015 | Moon | H04L 67/10 709/217 |
| 2015/0334645 A1 | 11/2015 | Di Chiara et al. | |
| 2016/0095036 A1* | 3/2016 | Stojanovski | H04W 88/16 370/331 |
| 2016/0119813 A1* | 4/2016 | Sridhar | H04W 28/0268 370/229 |
| 2016/0135104 A1* | 5/2016 | Lau | H04W 36/26 455/436 |
| 2016/0262078 A1* | 9/2016 | Yao | H04W 24/10 |
| 2016/0373953 A1* | 12/2016 | Fukuta | H04W 4/06 |
| 2017/0149626 A1 | 5/2017 | Yoon et al. | |
| 2018/0034598 A1* | 2/2018 | Yiu | H04W 52/0216 |
| 2018/0115475 A1 | 4/2018 | Broom et al. | |
| 2018/0160351 A1* | 6/2018 | Zhang | H04W 36/0083 |

FOREIGN PATENT DOCUMENTS

| | | |
|---|---|---|
| CN | 102014446 A | 4/2011 |
| CN | 102256237 A | 11/2011 |
| CN | 103546477 A | 1/2014 |
| CN | 104160734 A | 11/2014 |
| CN | 104322120 A | 1/2015 |
| CN | 105612778 A | 5/2016 |
| WO | 2014197878 A1 | 12/2014 |
| WO | 2018150248 A1 | 8/2018 |

OTHER PUBLICATIONS

Huawei, et al., "Discussion QoE Measurement Collection for streaming services", 3GPP TSG-RAN WG2 #96, Reno, Nevada, USA, Nov. 14, 2016, pp. 1-22, R2-168022, 3GPP.

Ericsson, "QoE SRNS Relocation Enhancement", 3GPP TSG-RAN WG3 Meeting #95bis, Spokane, USA, Apr. 3, 2017, p. 1, R3-171179, 3GPP.

3rd Generation Partnership Project,"3rd Generation Partnership Project; Technical Specification Group Services and System Aspects; Telecommunication management; Study on management aspects of next generation network architecture and features; (Release 14)", Technical Report, TR 28.802 V0.4.0, Jan. 1, 2017, pp. 1-14, 3GPP, France.

NTT Docomo, Inc., "MDT Context handling during handover", 3GPP TSG-RAN2#69bis, Apr. 12, 2010, pp. 1-2, Beijing, China, R2-102444.

Ericsson, "Open issues for QoE measurement collection", 3GPP TSG RAN WG2#97, Athens, Greece, Feb. 13, 2017, pp. 1-4, R2-1701604, 3GPP.

3rd Generation Partnership Project, "3rd Generation Partnership Project; Technical Specification Group Services and System Aspects; Telecommunication management; Subscriber and equipment trace; Trace control and configuration management (Release 13)", Technical Specification, 3GPP TS 32.422 V13.0.0, Jun. 1, 2015, pp. 1-152, 3GPP, France.

(56) References Cited

OTHER PUBLICATIONS

Nokia, "Consideration on QMC for steaming in UTRAN", 3GPP TSG-RAN WG2 #96, Reno, Nevada, USA, Nov. 14, 2016, pp. 1-4, R2-168138, 3GPP.

Huawei, "Introduction of QMC for streaming services", Change Request, 3GPP TSG-RAN WG3 Meeting #95, Athens, Greece, Feb. 13, 2017, pp. 1-40, R3-170915, 3GPP.

Ericsson, "QoE enhancement during SRNS relocation", Change Request, 3GPP TSG-RAN WG3 Meeting #95bis, Spokane, USA, Apr. 3, 2017, pp. 1-8, R3-171377, 3GPP.

3rd Generation Partnership Project, "Digital cellular telecommunications system (Phase 2+); Universal Mobile Telecommunications System (UMTS); LTE; Telecommunication management; Subscriber and equipment trace; Trace control and configuration management", Technical Specification, 3GPP TS 32.422 version 12.3.0 Release 12, ETSI TS 132 422 V12.3.0, Oct. 1, 2014, pp. 1-138, ETSI.

3rd Generation Partnership Project, "Digital cellular telecommunications system (Phase 2+) (GSM); Universal Mobile Telecommunications System (UMTS); LTE; Telecommunication management; Subscriber and equipment trace; Trace concepts and requirements", Technical Specification, 3GPP TS 32.421 version 14.0.0 Release 14, ETSI TS 132 421 V14.0.0, Apr. 1, 2017, pp. 1-48, ETSI.

3rd Generation Partnership Project, "3rd Generation Partnership Project; Technical Specification Group Radio Access Network; UTRAN Iu interface Radio Access Network Application Part (RANAP) signalling (Release 14)", Technical Specification, 3GPP TS 25.413 V14.1.0, Jun. 1, 2017, pp. 1-455, 3GPP, France.

Ericsson, "Discussion on QoE Measurement Collection for Streaming in RAN", 3GPP TSG-RAN WG3 Meeting #95, Feb. 13-17, 2017, pp. 1-3, Athens, Greece, R3-170694.

\* cited by examiner

METHOD AND NETWORK NODES TO MANAGE QOE MEASUREMENT COLLECTION DURING RELOCATION OR HANDOVER

RELATED APPLICATIONS

This application claims priority to U.S. Provisional Patent Application Ser. No. 62/458,943, filed 14 Feb. 2017, the disclosure of which is incorporated herein by reference in its entirety.

TECHNICAL FIELD

The present invention relates generally to wireless communication, and in particular to continuation of Quality of Experience Measurement collection following relocation or inter-RAT handover of a terminal.

BACKGROUND

Wireless communication networks are widely deployed, and are ubiquitous in many parts of the world. Wireless communication networks continue to evolve, expanding both the variety and complexity of services offered, and the number of subscribers. As these networks increase in area, scope, and complexity, effective management of the routine operation of the networks becomes increasingly difficult. In response, a number of partially- or fully-automated network diagnostic and analysis tools and procedures have been developed and standardized.

In 3GPP release 14 there is an ongoing work item for "Quality of Experience (QoE) Measurement Collection" for the Universal Mobile Telecommunications System (UMTS), the third-generation (3G), packet-based networking standard. A corresponding work item is planned for Long Term Evolution (LTE), the 4G standard, in release 15. Also, a later work item is planned for New Radio (NR), the 5G standard in development. The purpose of the work item(s) is to start measurements in a terminal, such as a User Equipment (UE), to collect information about the quality of streaming services used in the terminal. The streaming service is typically a third-party streaming application on top of packet-switched (PS) interactive Radio Access Bearers (RABs) defined in a radio access network (RAN). A purpose of the measurement collection is to be able to improve the RAN to get better quality of the streaming service. The current RAN-specific measurements are focused on radio related issues, and do not consider the end-user quality of the application being used.

Another purpose of the work item(s) is to use the Radio Resource Control (RRC) protocol to start the measurements and to transmit the result back from the terminal. The resulting file should be possible to extract in RAN, as the possible improvements will be done in RAN and there might be different operators for RAN and other parts of the network.

The measurements are initiated towards RAN by either a QoE Measurement request from the core network (CN) or from the network subset responsible for operations, administration and management (OAM). The QoE Measurement request contains an area where the terminal should perform the measurements, e.g., a list of cells, a routing area, or a public land mobile network (PLMN) area. A Radio Network Controller (RNC) then starts the measurements in the terminal by sending a so-called dash file to the terminal. The dash file contains configuration data for the terminal, e.g., duration of the QoE measurements and which data should be collected. The current approach assumes that the configuration file is included as a container in an RRC message. When the terminal has completed the QoE measurement collection, it sends a result file back to the RNC in another RRC message containing a result container. When the RNC has received the result file, it forwards it to a collection node where the contents of the dash file can be retrieved. The QoE measurement is managed and maintained by a Measurement Initiating node.

During relocation of servicing a terminal from a source network node to a target network node—e.g., UTRAN Serving Radio Network Subsystem (SRNS) Relocation, and in the future Inter-RAT Handover when UMTS, LTE and/or NR all support QoE—it is assumed that the QoE measurements should continue by the terminal.

The QoE configuration is sent either from OAM to RAN, or from CN to RAN. The QoE dash configuration file, the IP address, and collecting area are sent to RAN—in particular, to the terminal's serving node, also referred to as a base station (RNC in UTRAN, eNB in LTE; gNB in NR). Further there is a need to feedback to the OAM or the node that initiated the QoE measurement, e.g., Serving GRPS Support Node (SGSN) or the serving RNC, that the terminal with QoE measurement activated has been transferred to another serving node (e.g., new eNB or a serving node in a different RAN).

In order to allow the QoE measurement to continue after relocation, relevant parameters must be transferred smoothly from the source network node to the target network node, allowing the QoE measurement to be managed in the target network node.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section

SUMMARY

In order to address one or more issues identified above, various solutions are proposed herein. The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

Throughout this document, the following terms will be used. However, these are used for illustrative purposes, and should necessarily be limiting to the scope of the disclosed embodiments.

Measurement Initiating node—The node that initiated the measurements, e.g., SGSN, Mobility Management Entity (MME), Core in NR, or OAM. Different Measurement Initiating nodes may initiate different QoE Measurements, e.g., in different RANs.

Source network node—The serving node where the measurement is initiated, e.g., RNC, eNB, gNB. It is the source serving RAN/node during relocation or handover—meaning it provides wireless service to the terminal prior to the relocation or handover to the target network node.

Target network node—The serving node where the terminal is moving to and the QoE measurement continued, e.g., RNC, eNB, gNB. It is the target serving RAN/Node during relocation or handover—meaning it provides wireless service to the terminal after the relocation or handover from the source network node.

QoE Measurement—The measurements that are initiated by OAM, CN, or other nodes outside the RAN. The measurement results are collected at a QoE Measurement reporting node.

QoE Measurement reporting node—A network node to which the terminal reports the QoE Measurement results. The QoE Measurement reporting node may be identified by, e.g., an IP address or other form of network node identifier.

QoE Measurement parameters—A subset of the QoE configuration information provided to the source network node by the Measurement Initiating node (e.g., in CN or OAM), which are transferred by the source network node to a target network node upon an inter-RAT handover or relocation of a terminal for which the QoE Measurements are configured. The primary parameters that are passed to the target network node relate to measurement result collecting (i.e., the network address of the QoE Measurement reporting node) and the scope of the measurements (e.g., cell list), but may include additional information (e.g., the terminal ID, a timestamp, etc.). In any particular implementation, those of skill in the art may readily determine which QoE Measurement parameters are required or desired to be transferred, given the teachings of the present disclosure. In general, QoE Measurement parameters may include up to the entire set of QoE Measurement configuration information provisioned to the source network node, although as a practical matter, in most embodiments, the QoE Measurement parameters transferred will be comprise a subset of the full set of QoE Measurement configuration information.

According to embodiments described and claimed herein, the QoE Measurement parameters are transferred from the source network node to the target network node during a relocation or handover.

When the source network node is preparing for the relocation, e.g., SRNS Relocation or Inter-RAT handover, for a terminal which has QoE Measurement configured, the QoE Measurement parameters (e.g. measurement area scope, IP address of QoE Measurement reporting node, etc.) which have been received by the source network node from a first Measurement Initiating node, are sent from the source network node to the target network node.

The target network node provides information about the handling of the ongoing QoE Measurement to the source network node, e.g., whether the QoE measurement is supported (i.e. to be continued or terminated).

The source network node updates to the first Measurement Initiating node that the QoE Measurement is transferred to the target network node.

In the event the target network node has a QoE Measurement configured—such as by a second Measurement Initiating node (e.g., in OAM), different than the first Measurement Initiating node that configured the QoE Measurement in the source network node—then the target network node may send some portion of this target-RAN QoE Measurement information regarding back to the source network node. The source network node may then notify the first Measurement Initiating node, or other nodes, as required or desired.

In some embodiments, the Measurement Initiating node may then continue the QoE Measurement management towards the target network node. For example, the QoE Measurement may complete, and the target network node sends QoE Measurement results to the QoE Measurement reporting node (that is, the reporting node IP address, as transferred to the target network node from the source network node).

Although embodiments of the present invention are discussed herein primarily in terms of QoE measurement, this is only one example of the kinds of measurements encompassed herein. Other service-related measurements, which are similar to QoE Measurements, may advantageously employ the inventive solutions. Furthermore, although the embodiments are discussed primarily in terms of the UTRAN specification, this is only one example of the proposed solutions. The same or similar solutions may also apply to LTE, NR, or other network protocols. Additionally, the use of an SGSN is only an example. Other nodes or terminals may initiate and/or manage the QoE measurement. Similarly, SRNS Relocation is only an example. Similar solutions may apply to other inter-RAT handover, X2 handover in LTE, Xn handover in NR, etc.

One embodiment relates to a method, performed by a source network node operative in a wireless communication network, of transferring service of a terminal to a target network node. The source network node has a Quality of Experience (QoE) Measurement configured for the terminal by a first Measurement Initiating node. In response to a pending transfer of servicing the terminal from the source network node to a target network node, QoE Measurement parameters related to the QoE Measurement are sent to the target network node. Feedback indicating whether the QoE Measurement will be continued or terminated is received from the target network node. The first Measurement Initiating node is notified whether the QoE Measurement will be continued or terminated by the terminal following the transfer of servicing the terminal from the source to the target network node.

Another embodiment relates to a method, performed by a target network node operative in a wireless communication network, of transferring service of a terminal from a source network node. The source network node has a Quality of Experience (QoE) Measurement configured for the terminal by a first Measurement Initiating node. QoE Measurement parameters related to the QoE Measurement are received from the source network node. Whether or not to continue the QoE Measurement after the transfer is determined. Feedback indicating whether the QoE Measurement will be continued or terminated is sent to the source network node.

Still another embodiment relates to a source network node operative in a wireless communication network and operative to provide wireless communication service to a terminal prior to a transfer of the servicing of the terminal to a target network node. The source network node has a Quality of Experience (QoE) Measurement configured for the terminal by a first Measurement Initiating node. The source network node includes a transceiver operative to exchange wireless messages with the terminal and other network nodes, and processing circuitry operatively connected to the transceiver. The processing circuitry is operative to: in response to a pending transfer of servicing the terminal from the source network node to a target network node, send QoE Measurement parameters related to the QoE Measurement to the target network node; receive from the target network node, feedback indicating whether the QoE Measurement will be continued or terminated; and notify the first Measurement Initiating node whether the QoE Measurement will be continued or terminated by the terminal following the transfer of servicing the terminal from the source to the target network node.

Still another embodiment relates to a target network node operative in a wireless communication network and operative to provide wireless communication service to a terminal following a transfer of the servicing of the terminal from a source network node. The source network node has a Quality of Experience (QoE) Measurement configured for the terminal by a first Measurement Initiating node. The target network node includes a transceiver operative to exchange wireless messages with the terminal and other network nodes, and processing circuitry operatively connected to the transceiver. The processing circuitry operative to: receive QoE Measurement parameters related to the QoE Measurement from the source network node; determine whether to continue the QoE Measurement after the transfer; and send to the source network node, feedback indicating whether the QoE Measurement will be continued or terminated.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

The description below describes how a QoE (or similar) measurement management is continued after relocation or handover. According to certain embodiments, all of these steps may be performed. According to alternative embodiments, fewer steps may be performed, certain steps may be combined, and/or the order of the steps may be modified, as appropriate and as readily determined by one of skill in the art.

Step 1: During relocation or handover (e.g., SRNS Relocation or inter-RAT handover), when the source network node prepares the relocation, if it has QoE Measurement configured for the UE, it will send the relevant QoE Measurement parameters to the target network node. In one embodiment, this may comprise using defined RRC messages. In one embodiment, the QoE Measurement parameters are relayed to the target network node through the CN. For example, new information may be added to a RELOCATION REQUIRED message, which is sent from the source network node to CN, and in a RELOCATION REQUEST message, which is sent from CN to the target network node. The QoE Measurement parameters may include all or some of the following, as well as other information:

A network address of the QoE Measurement reporting node (e.g., IP address).
QoE Measurement collecting area (e.g., Cell list, LA, RA, PLMN);
Terminal identity: Identifies the terminal, could be e.g. International Mobile Subscriber Identity (IMSI), Temporary Mobile Subscriber Identity (TMSI), or the like; and/or
A timestamp;

The relevant QoE Measurement parameters sent from the first Measurement Initiating node to the source network node are forwarded from the source network node to the target network node. If the target network node can proceed to send the QoE measurement result to the QoE Measurement reporting node, the QoE measurement is continued smoothly. If the target network node cannot proceed, however, it may decide to terminate the QoE measurement.

As one example: new Information Elements (IEs) containing the QoE measurement parameters are added to a RELOCATION REQUIRED message (source network node→CN). Table 1 below provides examples of such additional IEs. The QoE measurement parameters are then sent in a RELOCATION REQUEST message (CN→target network node).

Step 2: The target network node sends feedback to the source network node about whether the QoE measurement is supported, will be continued or terminated. For example, the feedback is added as new IE (refer to Table 2 below) in a RELOCATION REQUEST ACKNOWLEDGE message (target network node→CN), and in a RELOCATION COMMAND message (CN→source network node).

Step 3: The source network node notifies the Measurement Initiating node that the QoE Measurement for the terminal is either terminated or continued in the target network node. The source network node notifies also the CN that the QoE measurement has been transferred to the target network node. For example, the notification is sent by adding a new IE in an UPLINK INFORMATION EXCHANGE REQUEST message (source network node→CN). The source network node may also need to provide information on the target network node.

Step 4: In some cases, the target network node may have a QoE Measurement configured by a second Measurement Initiating node, different than the first Measurement Initiating node (which configured the QoE Measurement in the source network node). For example, while a CN node may have initiated the QoE Measurement in the source network node (in the source RAN), OAM may have configured different QoE Measurement parameters in the target network node (in the target RAN). For example, the target network node QoE Measurement parameters may specify a different QoE Measurement reporting node. In this case, the target network node may continue to perform QoE Measurements according to its own configuration. The target network node may notify the source network node of this, for example sending some or all of the relevant QoE Measurement parameters to the source network node. The source network node may then notify the first Measurement Initiating node, or other relevant network node(s), and may include some or all of the QoE Measurement parameters received from the target network node. Of course, in embodiments in which the target network node is not configured with separate QoE parameters, and it simply continues the QoE Measurement using parameters supplied by the source network node, then this Step 4 would be omitted.

Although embodiments of the present invention have been explained using the examples of adding new IEs to the existing RRC messages, this is not a limitation. Alternatively, new IEs may added to other messages, and/or new RRC messages may be introduced for this signaling.

Figure 1:
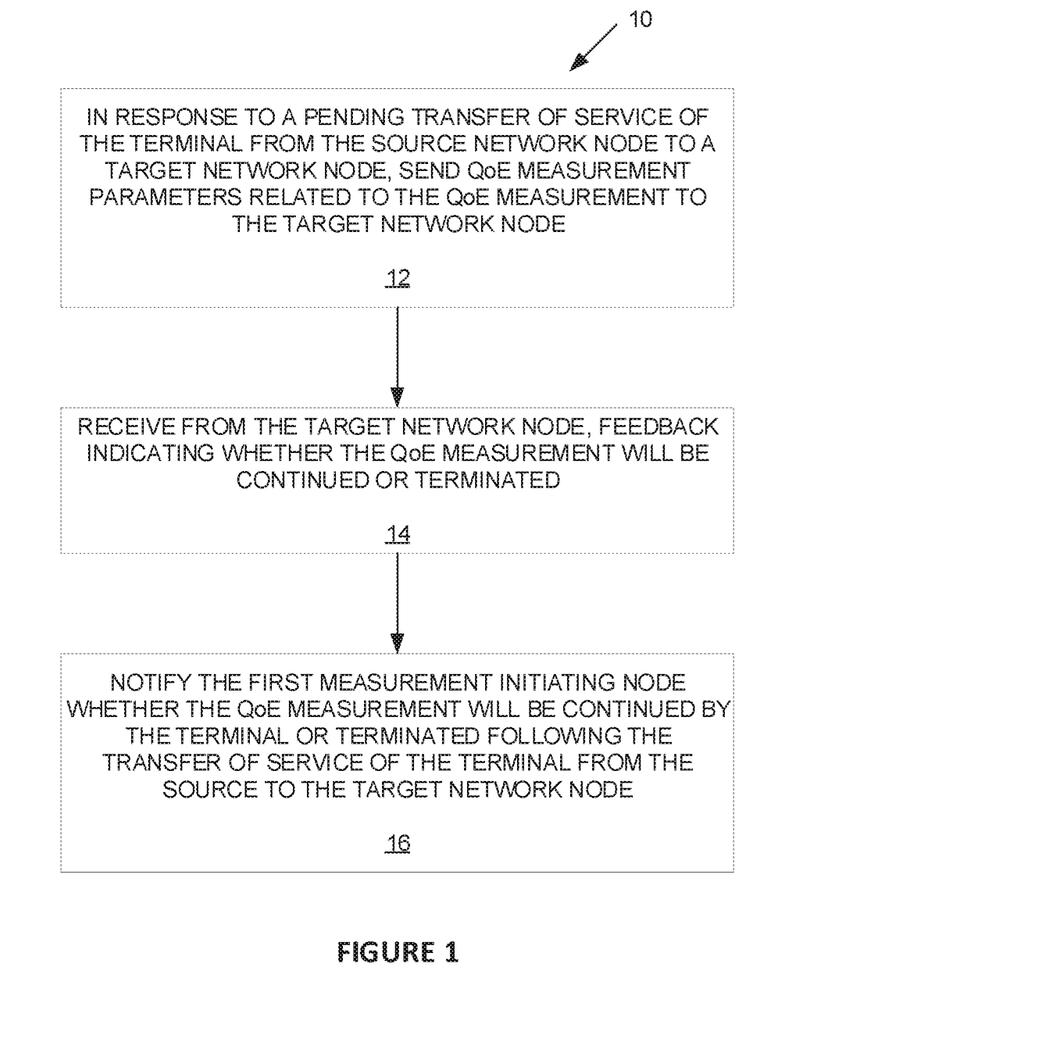
FIG. 1 is a flow diagram of a method, by a source network node, of transferring service of a terminal, for which a QoE Measurement is configured, to a target network node.
Figure 2:
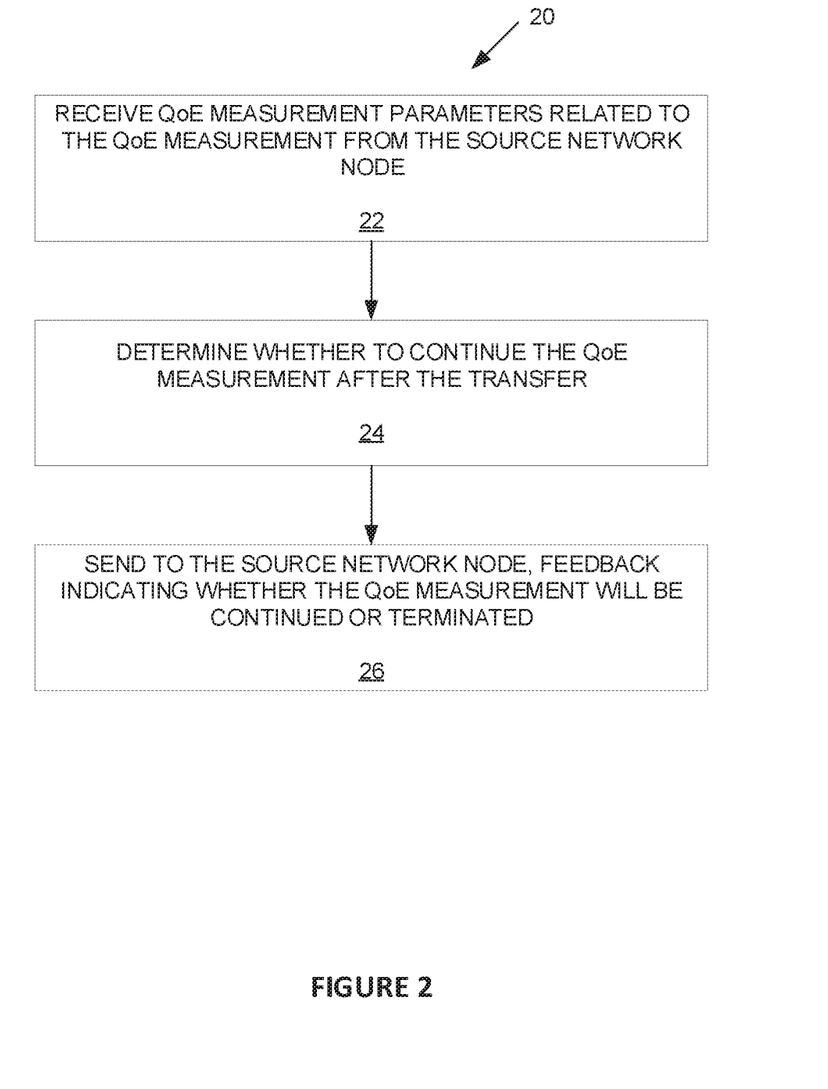
FIG. 2 is a flow diagram of a method, by a target network node, of transferring service of a terminal, for which a QoE Measurement is configured, from a source network node.

The above embodiments describe a series of actions and communication of messages between a source network node and target network node in a terminal relocation or inter-RAT handover. At each of these network nodes, specific steps are taken to implement this functionality. FIGS. 1 and 2 describe the steps of methods performed at each such node.

FIG. 1 depicts a method 10, performed by a source network node operative in a wireless communication network, of transferring service of a terminal to a target network node. The source network node has a Quality of Experience (QoE) Measurement configured for the terminal by a first Measurement Initiating node. In response to a pending transfer of service of the terminal from the source network node to a target network node, the source network node sends QoE Measurement parameters related to the QoE Measurement to the target network node (block 12). The source network node receives from the target network node, feedback indicating whether the QoE Measurement will be continued or terminated (block 14). The source network node notifies the first Measurement Initiating node whether the QoE Measurement will be continued by the terminal or terminated following the transfer of servicing the terminal from the source to the target network node (block 16).

FIG. 2 depicts a method 20, performed by a target network node operative in a wireless communication network, of transferring service of a terminal from a source network node. The source network node has a QoE Measurement configured for the terminal by a first Measurement Initiating node. The target network node receives QoE Measurement parameters related to the QoE Measurement from the source network node (block 22). The target network node determines whether to continue the QoE Measurement after the transfer (block 24). The target network node sends to the source network node, feedback indicating whether the QoE Measurement will be continued or terminated (block 26).

The embodiments contemplated herein have been described in terms of various network nodes and elements, which will now be described in more detail with reference to the accompanying Figures.

As discussed above, the solutions described herein may be implemented in any appropriate type of system using any suitable components. Particular embodiments of the described solutions may be implemented in a wireless network such as the example wireless communication network illustrated in FIG. 3. In the example embodiment of FIG. 3, the wireless communication network provides communication and other types of services to one or more terminals, referred to generally herein as terminals. In the illustrated embodiment, the wireless communication network includes one or more instances of network nodes that facilitate the terminals' access to and/or use of the services provided by the wireless communication network. The wireless communication network may further include any additional elements suitable to support communication between terminals or between a terminal and another communication device, such as a landline telephone.

Figure 3:
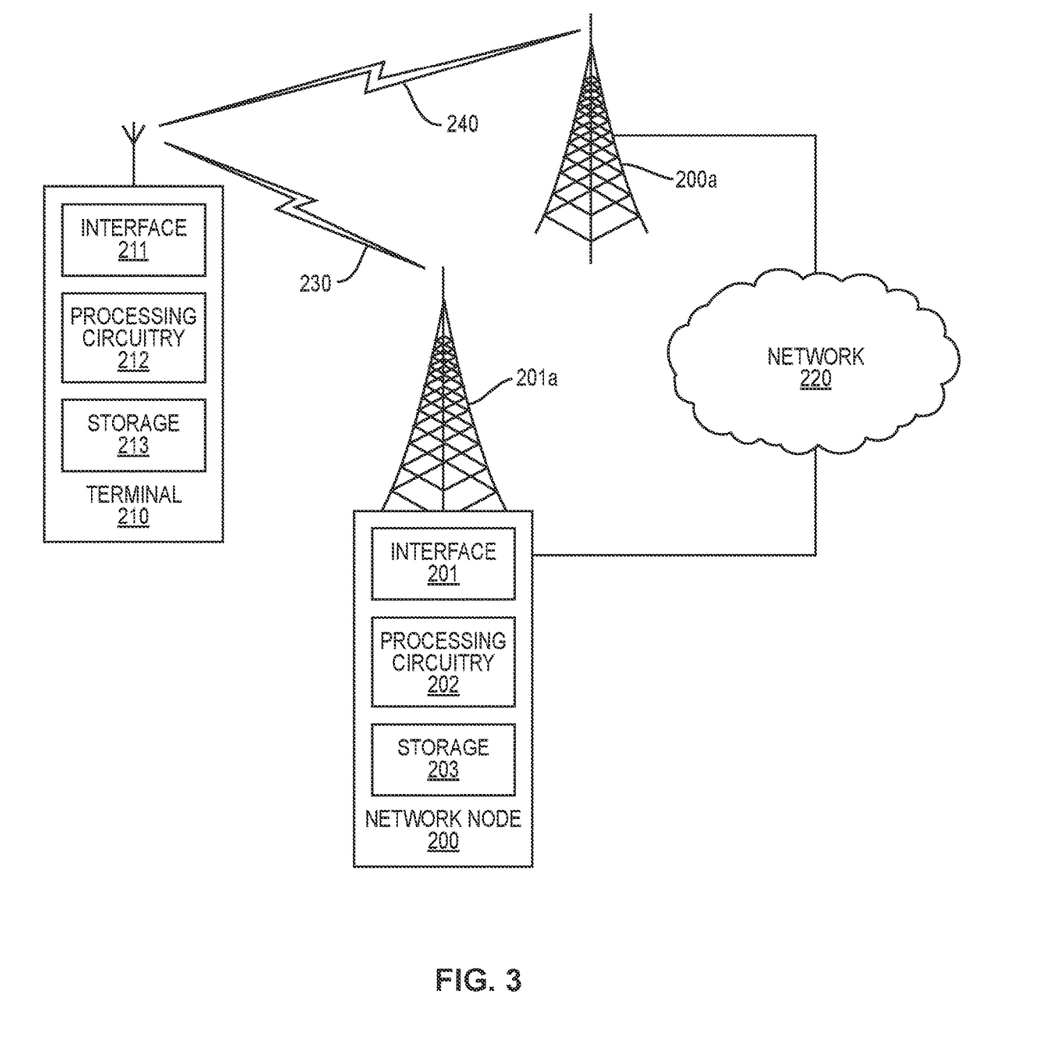
FIG. 3 is a functional block diagram of a representative wireless communication network.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 3 illustrates a wireless network comprising a more detailed view of network node 200 and terminal 210, in accordance with a particular embodiment. For simplicity, FIG. 3 only depicts network 220, network nodes 200 and 200a, and terminal 210. Network node 200 comprises processing circuitry 202, storage 203, interface 201, and antenna 201a. Similarly, terminal 210 comprises processing circuitry 212, storage 213, interface 211 and antenna 211a. These components may work together in order to provide network node and/or terminal functionality, such as providing wireless connections in a wireless network. In different embodiments, the wireless network may comprise any number of wired or wireless networks, network nodes, base stations, controllers, terminals, relay stations, and/or any other components that may facilitate or participate in the communication of data and/or signals whether via wired or wireless connections.

As used herein, "network node" refers to equipment capable, configured, arranged and/or operable to communicate directly or indirectly with a terminal and/or with other equipment in the wireless communication network that enable and/or provide wireless access to the terminal. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a terminal access to the wireless communication network or to provide some service to a terminal that has accessed the wireless communication network.

In FIG. 3, Network node 200 comprises processing circuitry 202, storage 203, interface 201, and antenna 201a. These components are depicted as individual units located within a single larger unit. In practice however, a network node may comprises multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processing circuitry 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processing circuitry 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processing circuitry 202 may execute instructions stored in storage 203. Such functionality may include providing various wireless features discussed herein to a terminal, such as terminal 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), Flash memory, removable media, or any other suitable local or remote memory component. Storage 203 may store any suitable instructions, data or information, including software and encoded logic, utilized by network node 200. Storage 203 may be used to store any calculations made by processing circuitry 202 and/or any data received via interface 201.

Network node 200 also comprises interface 201 which may be used in the wired or wireless communication of signaling and/or data between network node 200, network 220, and/or terminal 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201 a. The radio may receive digital data that is to be sent out to other network nodes or terminals via a wireless connection. The radio may convert the digital data into a radio signal having the appropriate channel and bandwidth parameters. The radio signal may then be transmitted via antenna 201a to the appropriate recipient (e.g., terminal 210). The interface 201 may include either or both of communication circuitry operative to exchange messages with other network nodes 200a, and a transceiver operative to wirelessly exchange messages with a terminal 201.

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "terminal" refers to a device capable, configured, arranged and/or operable to communicate wirelessly with network nodes and/or another terminal. Communicating wirelessly may involve transmitting and/or receiving wireless signals using electromagnetic signals, radio waves, infrared signals, and/or other types of signals suitable for conveying information through air. In particular embodiments, terminals may be configured to transmit and/or receive information without direct human interaction, also known as Machine-to-Machine (M2M) or Internet of Things (IoT) terminals. For instance, a terminal may be designed to transmit information to a network on a predetermined schedule, when triggered by an internal or external event, or in response to requests from the network. Generally, a terminal may represent any device capable of, configured for, arranged for, and/or operable for wireless communication, for example radio communication devices. Examples of terminals include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a terminal may represent a UE configured for communication in accordance with one or more communication standards promulgated by the $3^{rd}$ Generation Partnership Project (3GPP), such as 3GPP's GSM, UMTS, LTE, NR, NB-IoT, and/or other 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The terminal may support device-to-device (D2D) communication, for example by implementing a 3GPP standard for sidelink communication, and may in this case be referred to as a D2D communication device.

As yet another specific example, in an Internet of Things (IoT) scenario, a terminal may represent a machine or other device that performs monitoring and/or measurements, and transmits the results of such monitoring and/or measurements to another terminal and/or a network node. The terminal may in this case be a machine-to-machine (M2M) device, which may in a 3GPP context be referred to as a machine-type communication (MTC) device. As one particular example, the terminal may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal may represent a vehicle or other equipment that is capable of monitoring and/or reporting on its operational status or other functions associated with its operation.

A terminal as described above may represent the endpoint of a wireless connection, in which case the device may be referred to as a wireless terminal. Furthermore, a terminal as described above may be mobile, in which case it may also be referred to as a mobile terminal.

As depicted in FIG. 3, terminal 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other terminals. Terminal 210 comprises processing circuitry 212, storage 213, interface 211, and antenna 211a. Like network node 200, the components of terminal 210 are depicted as independent units located within a single larger unit, however in practice a terminal may comprises multiple different physical components that make up a single illustrated component (e.g., storage 213 may comprise multiple discrete microchips, each microchip representing a portion of the total storage capacity).

Processing circuitry 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other terminal 210 components, such as storage 213, terminal 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), Flash memory, removable media, or any other suitable local or remote memory component. Storage 213 may store any suitable data, instructions, or information, including software and encoded logic, utilized by terminal 210. Storage 213 may be used to store any calculations made by processor 212 and/or any data received via interface 211.

Interface 211 may be used in the wireless communication of signaling and/or data between terminal 210 and network node 200. For example, interface 211 may perform any formatting, coding, or translating that may be needed to allow terminal 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processing circuitry 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processing circuitry 212 and/or 202, possibly in cooperation with storage 213 and/or 203. Processing circuitry 212 and/or 202 and storage 213 and/or 203 may thus be arranged to allow processing circuitry 212 and/or 202 to fetch instructions from storage 213 and/or 203 and execute the fetched instructions to allow the respective functional module to perform any steps or functions disclosed herein.

Figure 4:
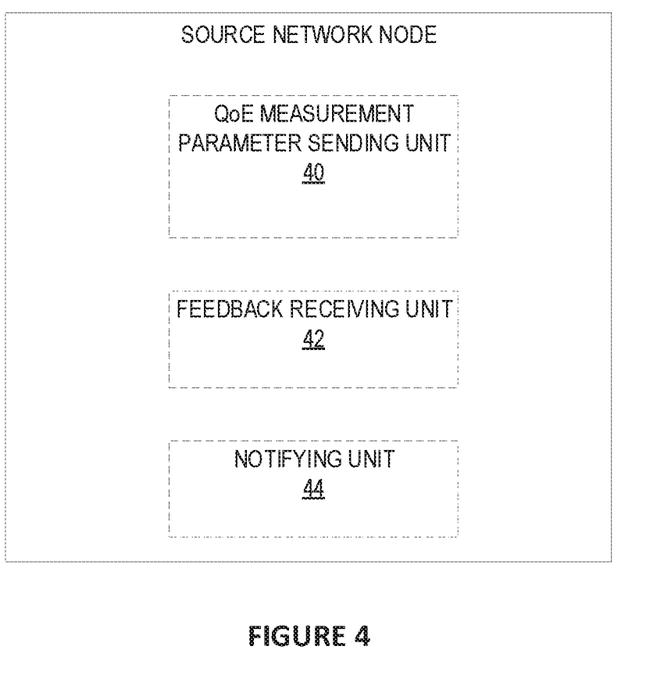
FIG. 4 is a block diagram of functional means, units, or modules in a source network node.

FIG. 4 illustrates a schematic block diagram of a source network node in a wireless network according to some embodiments (for example, the wireless network shown in FIG. 3). As shown, the source network node implements various functional means, units, or modules, e.g., via the processing circuitry 202 in FIG. 3 and/or via software code. These functional means, units, or modules, e.g., for implementing the method 10 described herein, include for instance: QoE Measurement parameter sending unit 40, feedback receiving unit 42, and notifying unit 44. QoE Measurement parameter sending unit 40 is configured to, in response to a pending transfer of service of the terminal from the source network node to a target network node, send QoE Measurement parameter related to the QoE Measurement to the target network node. The feedback receiving unit 42 is configured to receive from the target network node, feedback indicating whether the QoE Measurement will be continued or terminated. Notifying unit 44 is configured to notify the first Measurement Initiating node whether the QoE Measurement will be continued by the terminal or terminated following the transfer of service of the terminal from the source to the target network node.

Figure 5:
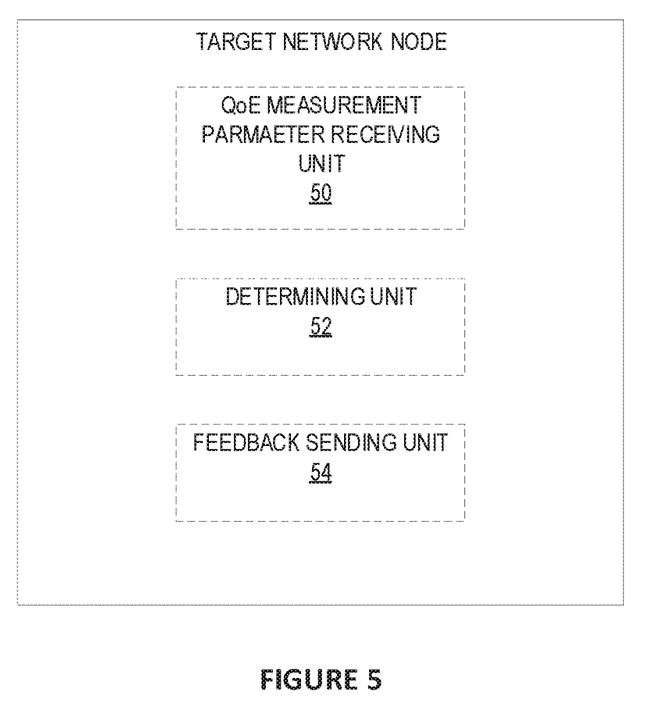
FIG. 5 is a block diagram of functional means, units, or modules in a target network node.

FIG. 5 illustrates a schematic block diagram of a target network node in a wireless network according to some embodiments (for example, the wireless network shown in FIG. 3). As shown, the target network node implements various functional means, units, or modules, e.g., via the processing circuitry 202 in FIG. 3 and/or via software code. These functional means, units, or modules, e.g., for implementing the method 20 described herein, include for instance: QoE Measurement parameter receiving unit 50, determining unit 52, and feedback sending unit 52. QoE Measurement parameter receiving unit 40 is configured to receive QoE Measurement parameter related to the QoE Measurement from the source network node. Determining unit 52 is configured to determine whether to continue the QoE Measurement after the transfer. Feedback sending unit 54 is configured to send to the source network node, feedback indicating whether the QoE Measurement will be continued or terminated.

Embodiments of the present invention present numerous advantages over the prior art, and may provide one or more technical advantages. They allow QoE Measurement collection to continue across a transfer of service of a terminal from a source network node to a target network node, such as a SRNS Relocation or inter-RAT handover. If the QoE Measurement is to be terminated, the originating Measurement Initiating node is notified. If the QoE Measurement is to be continued, it may be managed according to either the original QoE Measurement configuration, or a QoE Measurement configured in the target network node by a different network section (e.g., OAM). In either case, information such as the network address of the QoE Measurement reporting node is transferred, allowing the QoE Measurement to complete. In the future some other service measurement(s) may be introduced. Those future measurements can also be continued after relocation or handover, similarly to a QoE Measurement, by applying the teachings of the present disclosure. Other advantages may be readily available to one having skill in the art. Certain embodiments may have none, some, or all of the recited advantages.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

TABLE 1

New Information (bold and underlined) added to RELOCATION REQUIRED message in 3GPP TS 25.413, § 9.2.1.129.

| IE/Group Name | Presence | Range | IE type and reference | Semantics description | Criticality | Assigned Criticality |
|---|---|---|---|---|---|---|
| AreascopeforUE applicationlayer measurement configuration | M | | Areascopefor UEapplication layer measurement configuration 9.2.1.128 | | YES | ignore |
| Trace Reference | M | | 9.2.1.8 | | YES | ignore |
| Trace Propagation Parameters | O | | 9.2.1.68 | Optional for UTRAN. Not applicable to GERAN Iu Mode. | YES | ignore |
| TraceCollection EntityIPAddress | O | | 9.2.2.1 | | YES | ignore |

TABLE 2

New Information (bold and underlined) added to Target RNC to Source RNC Transparent Container IE in 3GPP TS 25.413, § 9.2.1.30

| IE/Group Name | Presence | Range | IE type and reference | Semantics description | Criticality | Assigned Criticality |
|---|---|---|---|---|---|---|
| RRC Container | M | | OCTET STRING | | | |
| d-RNTI | O | | INTEGER (0..1048575) | May be included to allow the triggering of the Relocation Detect procedure from the Iur Interface. | | |
| UEApplication Layer Measurement Support Indication | O | | BITSTRING (SIZE(8)) | Eachbitinthebitmap indicatesanUE Applicationlayer measurement. Bit0=QoE Value'1'indicates "Supported"andvalue'0' indicates"not Supported". | YES | ignore |

TABLE 2-continued

New Information (bold and underlined) added to Target RNC to Source RNC
Transparent Container IE in 3GPP TS 25.413, § 9.2.1.30

| IE/Group Name | Presence | Range | IE type and reference | Semantics description | Criticality | Assigned Criticality |
|---|---|---|---|---|---|---|
| | | | | Unusedbitsarereserved forfutureuse. | | |

What is claimed is:

1. A method, performed by a source network node operative in a Radio Access Network (RAN) of a wireless communication network, of transferring service of a terminal to a target network node, wherein the source network node has a Quality of Experience (QoE) Measurement configured for the terminal by a first Measurement Initiating, comprising:

in response to a pending transfer of service of the terminal from the source network node to a target network node, sending QoE Measurement parameters related to the QoE Measurement toward the target network node in an information element in a RELOCATION REQUIRED message sent to a Core Network (CN) of the wireless communication network, and wherein the CN sends the QoE Measurement parameters from the CN to the target network node in a RELOCATION REQUEST message;

receiving a message initiated by the target network node, the message including an information element, wherein the information element indicates whether the QoE Measurement will be continued or terminated following the transfer of service; and sending a message to the Measurement Initiating node, the message indicating whether the QoE Measurement will be continued by the terminal or terminated following the transfer of service of the terminal from the source to the target network node.

2. The method of claim 1 wherein the transfer of service of the terminal from the source network node to the target network node is an inter-RAT handover wherein the target network node operates according to a different Radio Access Technology than the source network node.

3. The method of claim 1 wherein the transfer of service of the terminal from the source network node to the target network node is a Serving Radio Network Subsystem (SRNS) relocation.

4. The method of claim 1 wherein the QoE Measurement parameters include one or more of a network address of a QoE Measurement reporting node, a timestamp, QoE Measurement collecting area, and an identifier of the terminal.

5. The method of claim 1 wherein receiving a message initiated by the target network node indicating whether the QoE Measurement will be continued or terminated comprises receiving feedback from the Core Network (CN) in a RELOCATION COMMAND message, wherein the target network node sent an indication whether the QoE Measurement will be continued or terminated to the CN in a RELOCATION REQUEST ACKNOWLEDGE message.

6. The method of claim 1 wherein sending a message to the first Measurement Initiating node indicating whether the QoE Measurement will be continued or terminated by the terminal following the transfer comprises sending the notification in an Information Element (IE) in an UPLINK INFORMATION EXCHANGE REQUEST message to the Core Network (CN).

7. The method of claim 1 wherein the target network node has a QoE Measurement configured by a second Measurement Initiating node different than the first Measurement Initiating node that configured the QoE Measurement in the source node, further comprising:

receiving, from the target network node, QoE Measurement parameters relating to the QoE Measurement configured in the target network node.

8. The method of claim 7 further comprising:

sending to the first Measurement Initiating node the QoE Measurement parameters received from the target network node.

9. A method, performed by a target network node operative in a Radio Access Network (RAN) of a wireless communication network, of transferring service of a terminal from a source network node, wherein the source network node has a Quality of Experience (QoE) Measurement configured for the terminal by a first Measurement Initiating node, comprising:

receiving, in an information element of a RELOCATION REQUEST message received from a Core Network (CN) of the wireless communication network, QoE Measurement parameters related to the QoE Measurement sent by the source network node to the CN in an information element of a RELOCATION REQUIRED message;

determining whether to continue the QoE Measurement after the transfer; and sending toward the source network node, a message including an information element, the information element indicating whether the QoE Measurement will be continued or terminated following the transfer of service.

10. The method of claim 9 wherein the transfer of service of the terminal from the source network node to the target network node is an inter-RAT handover wherein the source network node operates according to a different Radio Access Technology than the target network node.

11. The method of claim 9 wherein the transfer of service of the terminal from the source network node to the target network node is a Serving Radio Network Subsystem (SRNS) relocation.

12. The method of claim 9 wherein sending a message indicating whether the QoE Measurement will be continued or terminated toward the source network node comprises sending an indication whether the QoE Measurement will be continued or terminated to the Core Network (CN) in a RELOCATION REQUEST ACKNOWLEDGE message, which sends the indication to the source network node in a RELOCATION COMMAND message.

13. The method of claim 9 wherein the target network node has a QoE Measurement configured by a second Measurement Initiating node different than the first Measurement Initiating node that configured the QoE Measurement in the source node, further comprising:

sending to the source network node QoE Measurement parameters relating to the QoE Measurement configured in the target network node.

14. A source network node operative in a Radio Access Network (RAN) of a wireless communication network and adapted to provide wireless communication service to a terminal prior to a transfer of service of the terminal to a target network node, wherein the source network node has a Quality of Experience (QoE) Measurement configured for the terminal by a first Measurement Initiating node, the source network node comprising:
- a transceiver operative to exchange wireless messages with the terminal and other network nodes; and
- processing circuitry operatively connected to the transceiver, the processing circuitry adapted to:
  - in response to a pending transfer of service of the terminal from the source network node to a target network node, send QoE Measurement parameters related to the QoE Measurement to toward the target network node in a an information element in a RELOCATION REQUIRED message sent to the Core Network (CN), and wherein the CN sends the QoE Measurement parameters from the CN to the target network node in a RELOCATION REQUEST message;
  - receive a message initiated by the target network node, the message including an information element, wherein the information element indicates whether the QoE Measurement will be continued or terminated following the transfer of service; and
  - send a message to the first Measurement Initiating node, the message indicating whether the QoE Measurement will be continued or terminated by the terminal following the transfer of service of the terminal from the source to the target network node.

15. The source network node of claim 14 wherein the processing circuitry is adapted to receive a message indicating whether the QoE Measurement will be continued or terminated initiated by the target network node by receiving an indication from the Core Network (CN) in a RELOCATION COMMAND message, wherein the target network node sent the indication to the CN in a RELOCATION REQUEST ACKNOWLEDGE message.

16. The source network node of claim 14 wherein the processing circuitry is adapted to send a message to the first Measurement Initiating node, the message indicating whether the QoE Measurement will be continued or terminated by the terminal following the transfer by sending the indication in an Information Element (IE) in an UPLINK INFORMATION EXCHANGE REQUEST message to the Core Network (CN).

17. A target network node operative in a Radio Access Network (RAN) of a wireless communication network and adapted to provide wireless communication service to a terminal following a transfer of service of the terminal from a source network node, wherein the source network node has a Quality of Experience (QoE) Measurement configured for the terminal by a first Measurement Initiating node, the target network node comprising:
- a transceiver operative to exchange wireless messages with the terminal and other network nodes; and
- processing circuitry operatively connected to the transceiver, the processing circuitry adapted to:
  - receive, in an information element of a RELOCATION REQUEST message received from a Core Network (CN) of the wireless communication network, QoE Measurement parameters related to the QoE Measurement sent by the source network node to the CN in an information element of a RELOCATION REQUIRED message;
  - determine whether to continue the QoE Measurement after the transfer; and
  - send toward the source network node, a message including an information element, the information element indicating whether the QoE Measurement will be continued or terminated following the transfer of service.

18. The target network node of claim 17 wherein the processing circuitry is adapted to send a message indicating whether the QoE Measurement will be continued or terminated to the source network node by sending the indication to the Core Network (CN) in a RELOCATION REQUEST ACKNOWLEDGE message, which sends the indication to the source network node in a RELOCATION COMMAND message.

* * * * *